(12) United States Patent
Jeong et al.

(10) Patent No.: US 8,045,092 B2
(45) Date of Patent: Oct. 25, 2011

(54) MULTIFUNCTIONAL OPTICAL SHEET AND LIQUID CRYSTAL DISPLAY DEVICE INCLUDING THE SAME

(75) Inventors: Young-Hun Jeong, Gyeongsangbuk-do (KR); Hyeuk-Chan Kwon, Seoul (KR); Man-Hoan Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 161 days.

(21) Appl. No.: 12/149,677

(22) Filed: May 6, 2008

(65) Prior Publication Data

US 2008/0284943 A1    Nov. 20, 2008

(30) Foreign Application Priority Data

May 14, 2007  (KR) .................. 10-2007-0046644

(51) Int. Cl.
*G02F 1/1335* (2006.01)
(52) U.S. Cl. ............... 349/62; 349/63; 349/64; 349/65; 349/66; 349/67
(58) Field of Classification Search ............... 349/62–67
See application file for complete search history.

(56) References Cited

U.S. PATENT DOCUMENTS

| 7,095,464 | B2 * | 8/2006 | Ito | 349/112 |
| 7,593,072 | B2 * | 9/2009 | Kanatani et al. | 349/69 |
| 2003/0072080 | A1 | 4/2003 | Ariyoshi et al. | |
| 2004/0061944 | A1 | 4/2004 | Kashima | |
| 2004/0196414 | A1 * | 10/2004 | Liao et al. | 349/64 |
| 2006/0209562 | A1 * | 9/2006 | Lee et al. | 362/606 |
| 2007/0002583 | A1 * | 1/2007 | Lee et al. | 362/606 |

FOREIGN PATENT DOCUMENTS

| CN | 1888939 | 1/2007 |
| DE | 10 2005 044 844 | 12/2006 |
| DE | 10 2005 061 307 | 1/2007 |
| JP | 5-173134 | 7/1993 |
| KR | 10-2005-0004238 | 1/2005 |
| WO | WO 2006/080530 | 8/2006 |

* cited by examiner

*Primary Examiner* — Phu Vu
(74) *Attorney, Agent, or Firm* — McKenna Long & Aldridge, LLP.

(57) ABSTRACT

A multifunctional optical sheet for a liquid crystal display device includes a substrate diffusing incident light; a light-concentrating layer on the substrate and including a plurality of patterns that arranged to form alternating peaks and valleys; and reflection patterns between the substrate and the light-concentrating layer corresponding to the valleys of the light concentrating layer.

17 Claims, 14 Drawing Sheets

MULTIFUNCTIONAL OPTICAL SHEET AND LIQUID CRYSTAL DISPLAY DEVICE INCLUDING THE SAME

This application claims the benefit of Korean Patent Application No. 2007-0046644 filed in Korea on May 14, 2007, which is hereby incorporated by reference for all purposes as if fully set forth herein.

BACKGROUND OF THE INVENTION

1. Field of the Invention

The invention relates to a liquid crystal display device, and more particularly, to a multi-functional optical sheet for a liquid crystal display device.

2. Discussion of the Related Art

With the rapid development of information technology, flat panel display (FPD) devices, such as liquid crystal display (LCD) devices, plasma display panels (PDPs), electroluminescent display (ELD) devices and field emission display (FED) devices, have been developed and have replaced cathode ray tubes (CRTs).

Among these devices, liquid crystal display (LCD) devices widely used for monitors of notebook computers, monitors of personal computers and as displays for televisions because the LCD devices are excellent at displaying moving images and have a high contrast ratio.

LCD devices are not self-luminescent and require an additional light source. By disposing a backlight unit at the rear side of a liquid crystal (LC) panel to emit light into the LC panel, discernible images can be displayed. Backlight units may include cold cathode fluorescent lamps (CCFLs), external electrode fluorescent lamps (EEFLs) or light-emitting diodes (LEDs) as a light source.

Backlight units are classified as edge type or direct type according to the position of the light source with respect to the display panel. In edge-type backlight units, one or a pair of lamps are disposed at one side or at each of two sides of a light guide panel of a backlight unit. In direct-type backlight units a plurality of lamps are disposed directly under a display panel.

FIG. 1 is a cross-sectional view illustrating a liquid crystal display (LCD) device including a direct-type backlight unit according to the related art. The related art LCD device includes a liquid crystal panel 10, a back light unit 50, a support main 60, a top cover 70 and a cover bottom 80. The liquid crystal panel 10 includes upper and lower substrates 13 and 15. A printed circuit board (not shown) is attached at a side of the liquid crystal panel 10. The support main 60 surrounds side surfaces of the liquid crystal panel 10 and the backlight unit 50. The top cover 70 covers edges of a front surface of the liquid crystal panel 10, and the cover bottom 80 covers a rear surface of the backlight unit 50. The top cover 70 and the cover bottom 80 are combined with the support main 60 to thereby constitute one-united body.

The backlight unit 50 includes a reflection sheet 40, a plurality of lamps 30, a diffuser plate 22, and a plurality of optical sheets 20. The plurality of lamps 30 are disposed over the reflection sheet 40, and the diffuser plate 22 and the plurality of optical sheets 20 are sequentially disposed over the plurality of lamps 30.

The plurality of optical sheets 20 includes a diffuser sheet and at least one light-concentrating sheet. The plurality of optical sheets 20 will be described in more detail with reference to FIG. 2.

FIG. 2 is a view schematically illustrating the diffuser plate and the plurality of optical sheets of FIG. 1. As shown in FIG. 2, the plurality of optical sheets 20 includes a diffuser sheet 24 and a light-concentrating sheet 26 sequentially disposed over the diffuser plate 22.

The diffuser plate 22 may be formed of transparent acrylic resin, polymethylmethacrylate (PMMA) or thermoplastic polyethylene terephthalate (PET) including irregular particles therein. The diffuser plate 22 may have various haze properties. The diffuser plate 22 directs light emitted from the plurality of lamps 30 of FIG. 1 towards the liquid crystal panel 10 of FIG. 1 and diffuses light such that light is incident on the liquid crystal panel 10 of FIG. from a relatively wide range of angles.

The diffuser sheet 24 positioned over the diffuser plate 22 is generally composed of a base film of PET and acrylic resin layers on both sides of a base film that includes a light diffuser such as beads. The diffuser sheet 24 diffuses light from the diffuser plate 22 so that there may be no patched portion due to partially centralized light, and the diffuser sheet 24 directs light towards the light-concentrating sheet 26.

The light-concentrating sheet 26 includes a base film of PET and prism patterns 28 regularly arranged on an upper surface of the base film. The prism patterns 28 generally reflect and concentrate light.

FIG. 3 is a view illustrating paths of light passing through the light-concentrating sheet of FIG. 2.

As shown in FIG. 3, light incident on the light-concentrating sheet 26 has an angle of about 5 degrees with respect to the normal to a lower surface of the light-concentrating sheet 26. Light incident on a light-concentrating region A is refracted by the prism patterns 28 and is concentrated toward the liquid crystal panel 10 of FIG. 1 to thereby cause an increase of brightness. Light incident on a total reflection region B is reflected downward at a surface of the prism patterns 28.

The reflected light is re-reflected by the reflection sheet 40 to be re-supplied to the light-concentrating sheet 26. Therefore, a loss of light is minimized.

However, in addition to the concentration and reflection of light in the light-concentrating sheet 26, there is a loss of light due to side lobes. This loss decreases light efficiency and adversely affects viewing angle properties of the display.

More particularly, in the figure, a region designated by C means a region where there occur side lobes, wherein the region C is referred to as a side lobe region. Light incident on the side lobe region C is refracted at the surface of the prism patterns 28 in an undesired direction and not toward the liquid crystal panel 10 of FIG. 1, and is wasted. In other words, there is light leakage in the side lobe regions C.

FIGS. 4 and 5 are graphs of illustrating distributions of brightness and distribution of light versus viewing angles for a backlight unit that includes the related art light-concentrating sheet of FIG. 3. As may be appreciated from FIGS. 4 and 5, there are bright areas at both sides with respect to a center region O, and there are side lobe regions C.

To solve the problems described above, a reflective polarizing sheet or a diffuser sheet for recycling light may be further disposed over the light-concentrating sheet to decreased or removed the side lobes to thereby improve a light efficiency and viewing angle properties. This solution increases the number of optical sheets used in a display and increases the manufacturing time for producing a liquid crystal display module. Accordingly, manufacturing process efficiencies are lowered and costs are increased.

SUMMARY OF THE INVENTION

Accordingly, the present invention is directed to a multi-functional optical sheet and a liquid crystal display device including the same that substantially obviate one or more of the problems due to limitations and disadvantages of the related art.

An advantage of the present invention is to provide a multifunctional optical sheet and a liquid crystal display device including the same that remove side lobes of a backlight unit and improve a light efficiency and viewing angle properties, thereby displaying images of uniform brightness and high quality.

Another advantage of the present invention is to provide a multifunctional optical sheet and a liquid crystal display device including the same that improve process efficiency due to simplification of manufacturing processes and that decrease manufacturing costs.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of embodiments of the invention, as embodied and broadly described, a multifunctional optical sheet for a liquid crystal display device includes: a substrate diffusing incident light; a light-concentrating layer on the substrate and including a plurality of patterns that arranged to form alternating peaks and valleys; and reflection patterns between the substrate and the light-concentrating layer corresponding to the valleys of the light concentrating layer.

In another aspect, a liquid crystal display device includes a liquid crystal panel; a multifunctional optical sheet under the liquid crystal panel, the multifunctional optical sheet including a light-diffusing means, a light-concentrating means including peaks and valleys alternating each other, and reflection patterns corresponding to the valleys; at least one lamp under the multifunctional optical sheet; and a reflection sheet under the at least one lamp.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 6:
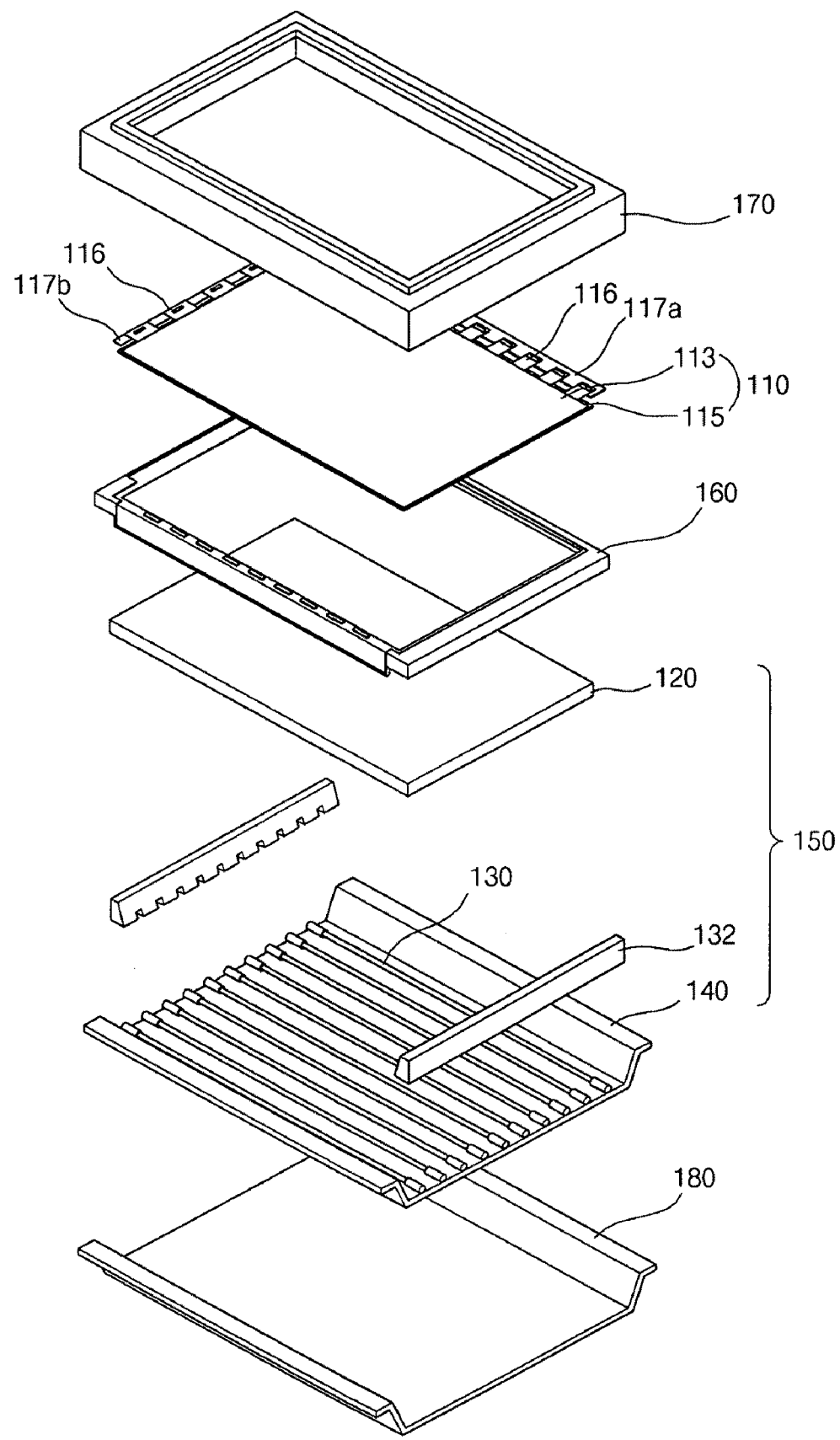
FIG. 6 is a perspective view of an LCD module according to an exemplary embodiment of the present invention.

FIG. 6 is a perspective view of an LCD module according to an exemplary embodiment of the present invention.

In FIG. 6, an LCD module includes a liquid crystal panel 110, a backlight unit 150, a support main 160, a top cover 170, and a cover bottom 180.

The liquid crystal panel 110 displays images. The liquid crystal panel 110 includes first and second substrates 113 and 115 facing and attached to each other with a liquid crystal layer interposed therebetween. Source and gate printed circuit boards 117a and 117b are attached to adjacent sides of the liquid crystal panel 110 via flexible printed circuit boards 116, for example, respectively. The source and gate printed circuit boards 117a and 117b are bent toward a respective side surface or a rear surface of the cover bottom 180 during a module assembly process. The gate printed circuit board 117b provides gate lines with scanning signals for turning on/off the thin film transistors, and the source printed circuit board 117a provides data lines with image signals for each frame.

The backlight unit 150 is disposed under the liquid crystal panel 116, and the support main 160 of a rectangular frame overlap edges of the backlight unit 150 and the liquid crystal panel 110. The top cover 170 covers edges of the front side of the liquid crystal panel 110, and the cover bottom 180 covers a rear surface of the backlight unit 150. The top cover 170 and the cover bottom 180 are combined with the support main 160.

The backlight unit 150 includes a reflection sheet 140, a plurality of lamps 130 arranged over the reflection sheet 140, and a multifunctional optical sheet 120 over the lamps 130. The lamps 130 are fixed by a pair of side supports 132, which are combined with the cover bottom 180.

The backlight unit 150 may further include lamp guides. The lamp guides prevent the multifunctional optical sheet 120 sagging to thereby maintain a substantially uniform distance between the lamps 130 and the multifunctional optical sheet 120 and to prevent the lamps 130 from shaking or breaking down due to exterior impacts.

Light is emitted from the lamps 130 and enters the multifunctional optical sheet 120. While passing through the multifunctional optical sheet 120, the light is redirected into a uniform plane light beam. The plane light beam is provided to the liquid crystal panel 110 to enable the liquid crystal panel 110 displays images.

In the backlight unit 150 including the multifunctional optical sheet 120 side lobes may be reduced or eliminated. Removing the side lobes using the optimized multifunctional optical sheet 120 increases an efficiency of concentrating light and increases brightness as viewed from the front side of the display FIG. 7 is a cross-sectional view schematically illustrating a structure of a multifunctional optical sheet according to a first embodiment of the present invention.

Figure 7:
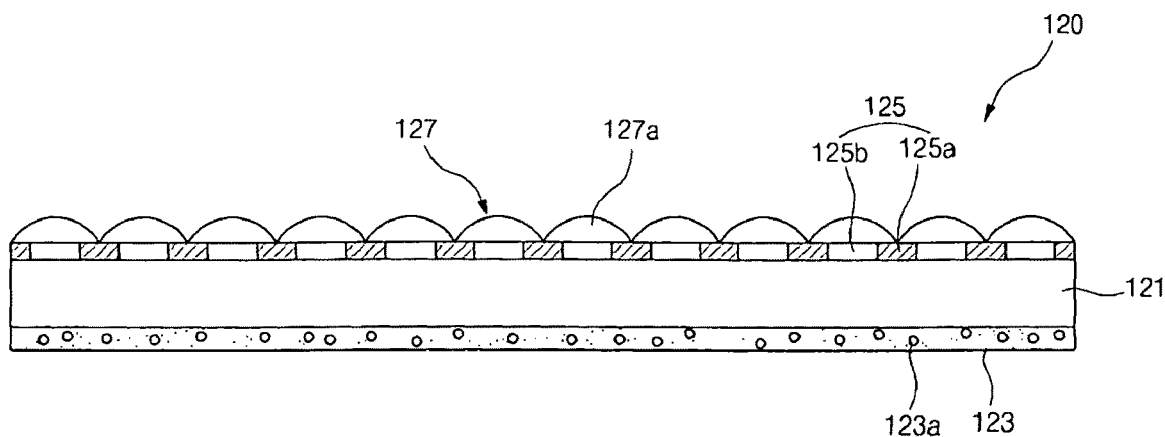
FIG. 7 is a cross-sectional view schematically illustrating a structure of a multifunctional optical sheet according to a first embodiment of the present invention.

In FIG. 7, a multifunctional optical sheet 120 includes a base plate 121, a diffusion layer 123 for diffusing light emitted from the lamps 130 of FIG. 6, a light-concentrating layer 127 for concentrating the light diffused by the diffusion layer 123 towards the liquid crystal panel 110 of FIG. 6, and a reflection layer 125 for recycling part of light.

The base plate 121 includes a transparent material. The diffusion layer 123 is formed on a lower surface of the base plate 121. The diffusion layer 123 has various haze properties depending on the desired light uniformity. As used herein, haze refers to a phenomenon whereby when light is transmitted thought a transparent film, the light is diffused by a material of the film in addition to undergoing reflection or absorption and the clarity of the film is externally obscured. Haze values are determined by the following equation 1.

Haze value(%)=((total transmitted quantity of light−quantity of light traveling straight)/transmitted quantity of diffused rays of light)×100       Equation 1.

By controlling the haze values, expectable brightness and viewing angles can be obtained. If a haze value is less than 30%, light diffusion is lowered, resulting in narrowed viewing angles for the display. If the haze value is more than 90%, light transmittivity is lowered, resulting in decreased display brightness.

Therefore, the diffusion layer 123 desirably has haze values within a range of 40% to 80% so that the light diffusion and the light transmittivity are uniform.

To obtain the above-mentioned haze values, the diffusion layer 123 may include a light-diffusing means such as beads 123a. Alternatively, the diffusion layer 123 may include fine patterns at a lower surface thereof and the beads 123a may be omitted.

The diffusion layer 123 may be formed of an acrylic resin material with the beads 123a contained therein. The beads 123a disperse light incident on the diffusion layer 123 and prevent light from being partially concentrated.

The diffusion layer 123 employing fine patterns in lieu of the beads 123a controls scattering angles of light according to shapes of the fine patterns. The fine patterns may be elliptical patterns or polygonal patterns, for example. The fine patterns may be hologram patterns that refract light toward an asymmetrical direction depending on an incident direction due to interference patterns, whereby concentrated light may be diffused along more inclined angles.

Through use of the fine patterns or beads 123a, light is diffused and is prevented from being partially concentrated.

In addition, the light-concentrating layer 127 is formed on an upper surface of the base plate 121 opposite to the lower surface of the base plate 121 on which the diffusion layer 123 is formed. The light-concentrating layer 127 includes dome-shaped lenticular lens patterns 127a, which are arranged in parallel lines to concentrate light. The lenticular lens patterns 127a are disposed parallel to each other to form peaks and valleys that alternate with each other.

The reflection layer 125 is formed between the base plate 121 and the light-concentrating layer 127, more particularly, the lenticular lens patterns 127a. The reflection layer 125 includes reflection patterns 125a corresponding to the valleys formed between the lenticular lens patterns 127a on the upper surface of the base plate 121. The reflection layer 125 may be formed of titanium oxide ($TiO_2$) or magnesium oxide (MgO) and may have a band shape. A portion 125b of the reflection layer 125 between the reflection patterns 125a may be formed of a transparent material.

Light incident on the multifunctional optical sheet 120 may have an angle of about 5 degrees with respect to the normal to a lower surface of the light-concentrating layer 127. A light-concentrating region L, a total reflection region M and a blocking-reflection region N may be defined due to light properties depending on optical paths of light.

Figure 8:
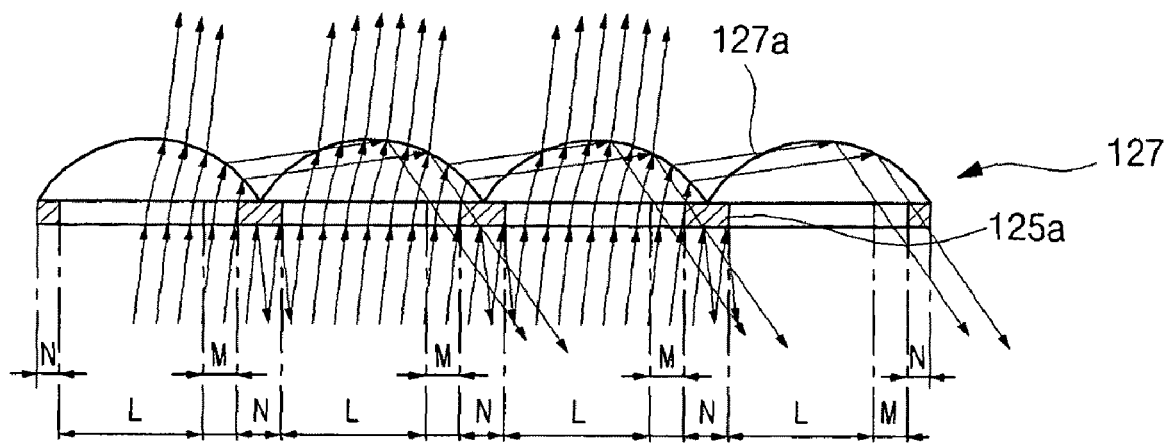
FIG. 8 is a view schematically illustrating paths of light passing through the multifunctional optical sheet of FIG. 7.

As shown in FIG. 8, light passing through the diffusion layer 123 is incident on the light-concentrating region L and is concentrated by the lenticular lens patterns 127a such that light passing through the lenticular lens patterns 127a has an angle of about 60 degrees to about 90 degrees with respect to the lower surface of the light-concentrating layer 127 to thereby increase the brightness.

Light incident on the total reflection region M is refracted at surfaces of the lenticular lens patterns 127a and is reflected back towards the source direction. The reflected light is reflected again by the reflection sheet 140 of FIG. 6 and is recycled to thereby minimize a loss of light.

Light incident on the blocking-reflection region N reaches the reflection patterns 125a and is reflected back towards the source direction. Similarly with the total reflection region M, the light reflected by the reflection patterns 125a is reflected again by the reflection sheet 140 of FIG. 6 toward the liquid crystal panel 110 of FIG. 6 and is recycled to thereby minimize a loss of light.

The multifunctional optical sheet 120 according to the present invention includes the blocking-reflection region in place of the side lobe region of the related art. The multifunctional optical sheet 120 causes light that would be refracted toward an undesired direction and wasted in the related art backlight units to be re-reflected by the reflection sheet 140 of FIG. 6 to reduce and/or eliminate the side lobes.

The multifunctional optical sheet 120 is disposed over the lamps 130 of FIG. 6 such that the diffusion layer 123 of the multifunctional optical sheet 120 is adjacent to the lamps 130 of FIG. 6. By using this arrangement, the side lobes are prevented and more uniform brightness is achieved.

Meanwhile, widths and thicknesses of the reflection patterns 125a and of the reflection layer 125 depend on a thickness and/or a refractive index of the light-concentrating layer 127 or may depend on the range of angles of transmitted light. An aperture ratio of the multifunctional optical sheet 120 due to the reflection patterns 125a, beneficially, may be within a range of about 30% to about 70%.

To obtain wider viewing angles, the aperture ratio due to the reflection patterns 125a may be within a range of about 45% to about 70%. Alternatively, to obtain higher brightness at the front side, the aperture ratio due to the reflection patterns 125a may be within a range of about 30% to about 40%.

Figure 1:
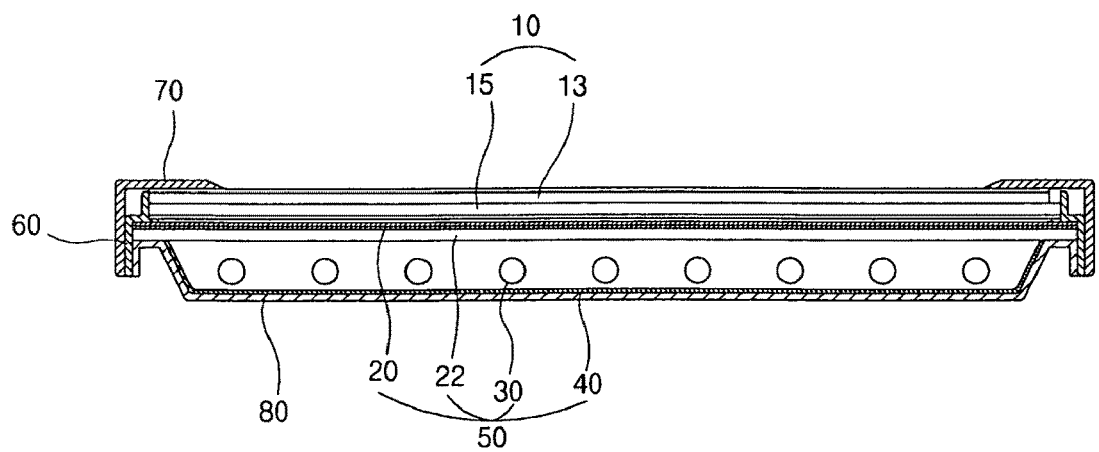
FIG. 1 is a cross-sectional view illustrating a liquid crystal display (LCD) device including a direct-type backlight unit according to the related art.
Figure 2:
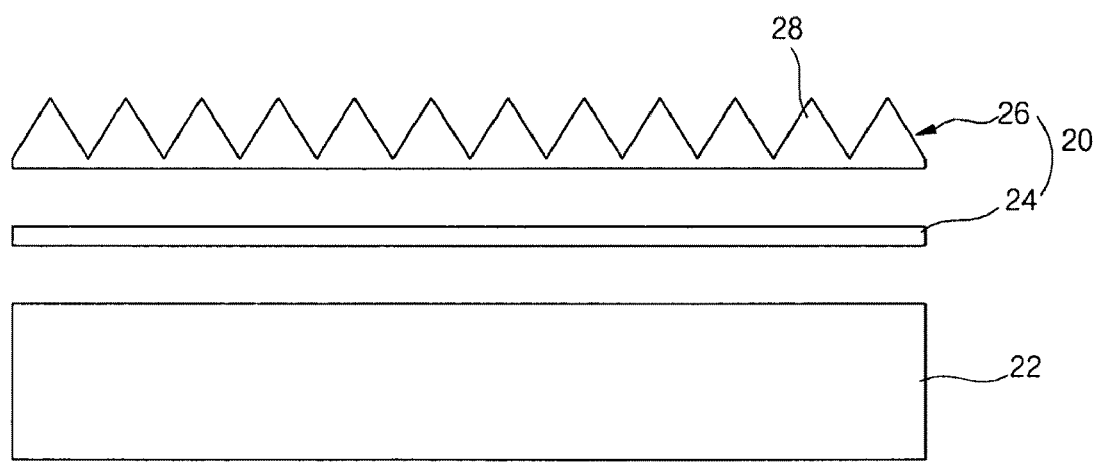
FIG. 2 is a view schematically illustrating the diffuser plate and the plurality of optical sheets of FIG. 1.
Figure 3:
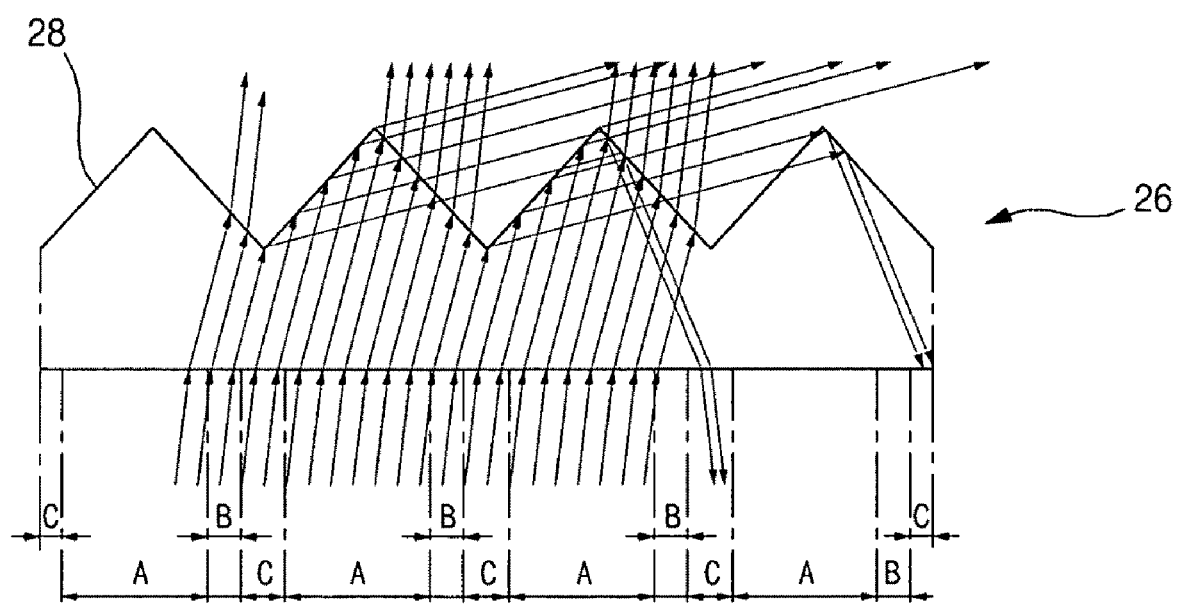
FIG. 3 is a view illustrating paths of light passing through the light-concentrating sheet of FIG. 2.
Figure 4:
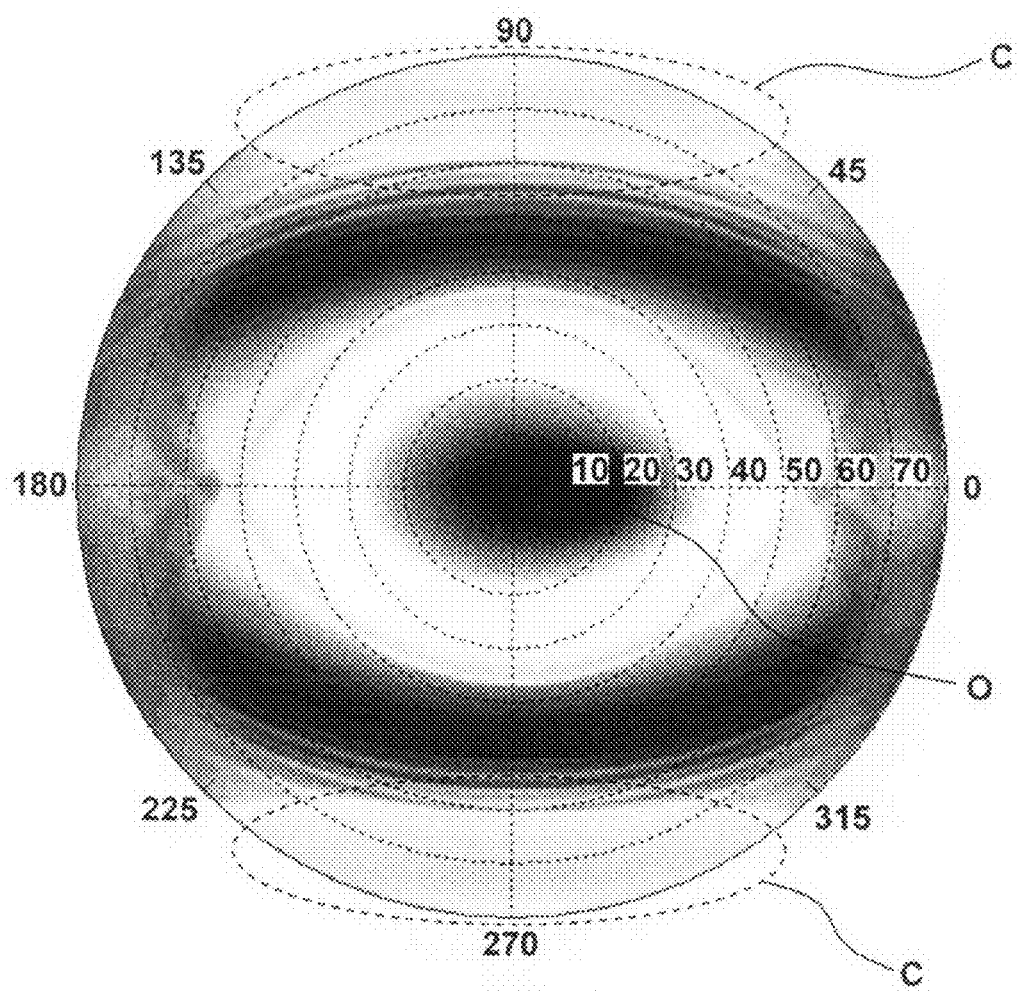
FIGS. 4 and 5 are graphs illustrating distributions of brightness and distribution of light versus viewing angles in a backlight unit including a related art light-concentrating sheet of FIG. 3, respectively.
Figure 5:
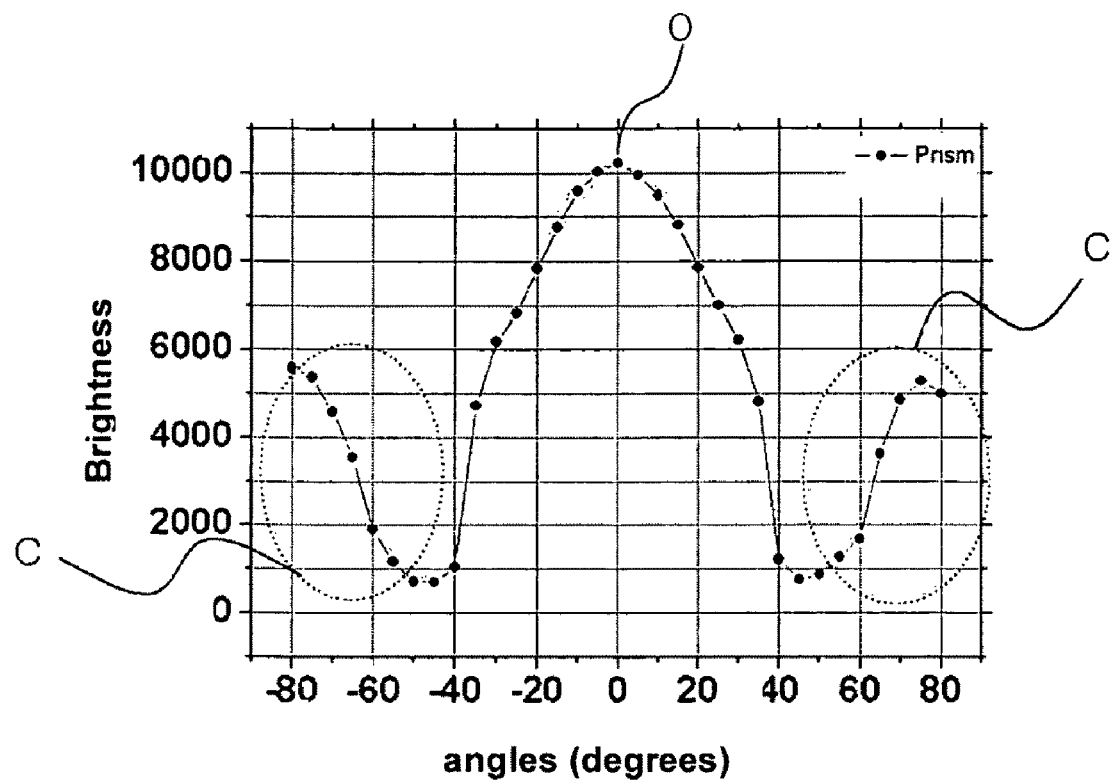
Figure 9:
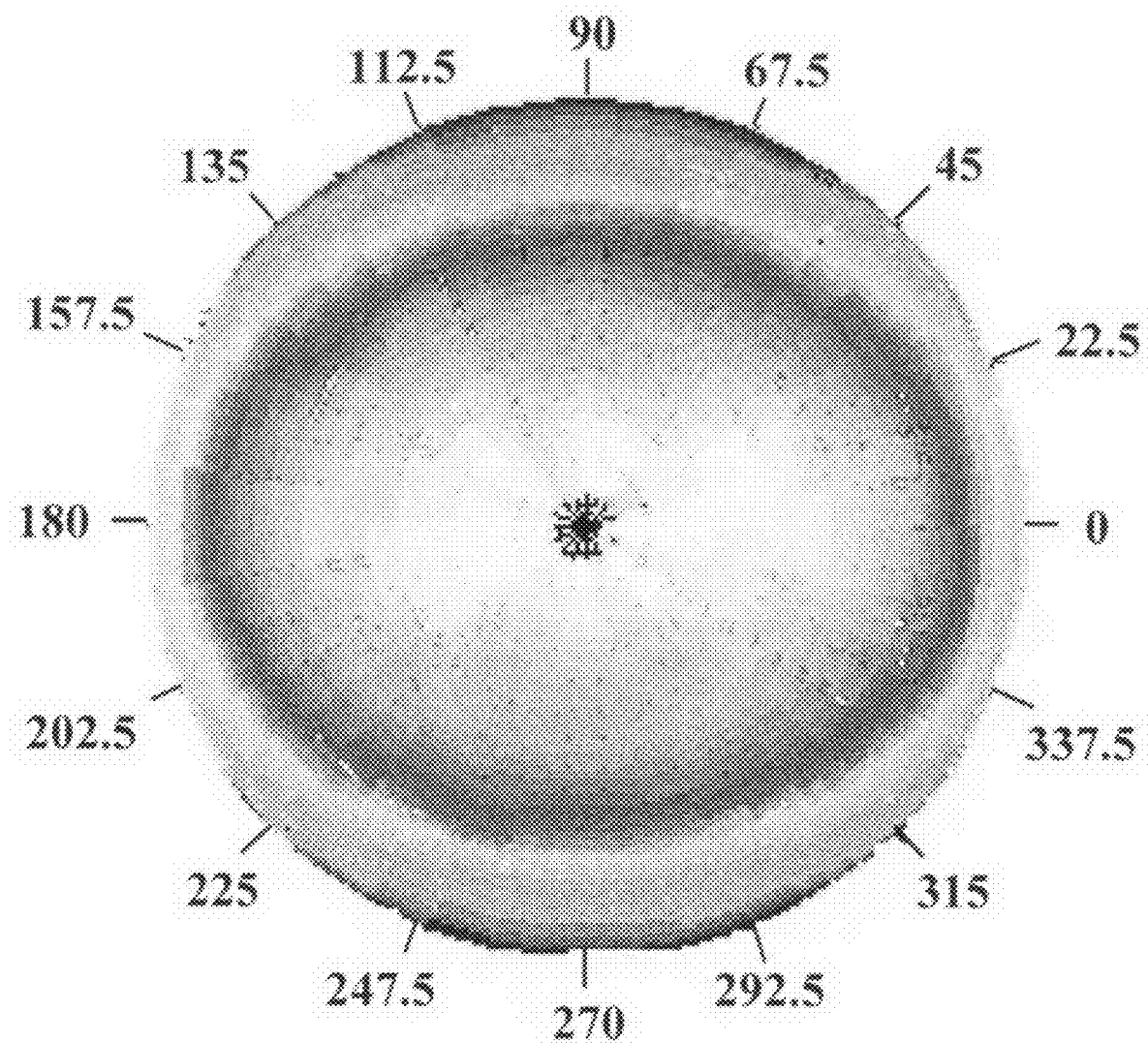
FIGS. 9 and 10 are graphs illustrating a distribution of brightness and a distribution of light versus viewing angles in a backlight unit including the above-mentioned multifunctional optical sheet, respectively.
Figure 10:
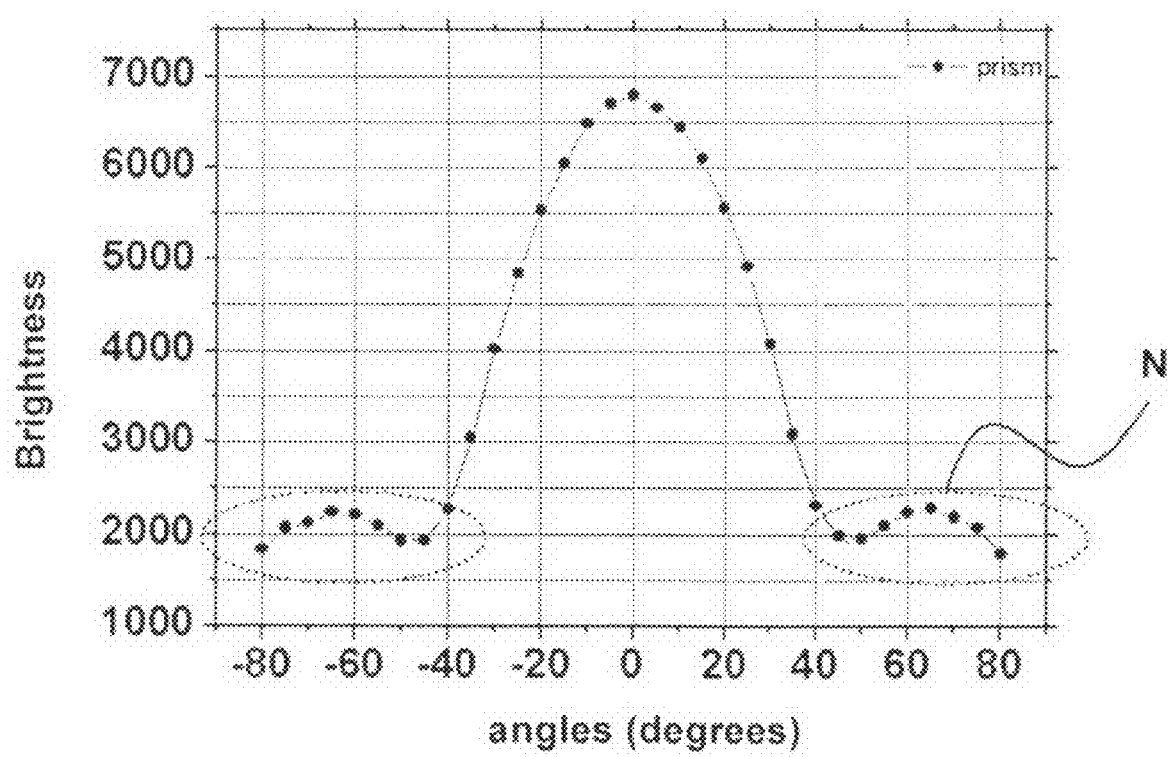

FIGS. 9 and 10 are graphs illustrating a distribution of brightness and a distribution of light versus viewing angles in a backlight unit including the above-mentioned multifunctional optical sheet, respectively. As shown in the figures, side lobes of the backlight unit including the related art light-concentrating sheet 26 of FIG. 2 are eliminated in the blocking-reflection region N.

Alternatively, prism patterns having a vertical angle of 90 degrees may be used in place of the lenticular lens patterns 127a.

Figure 11:
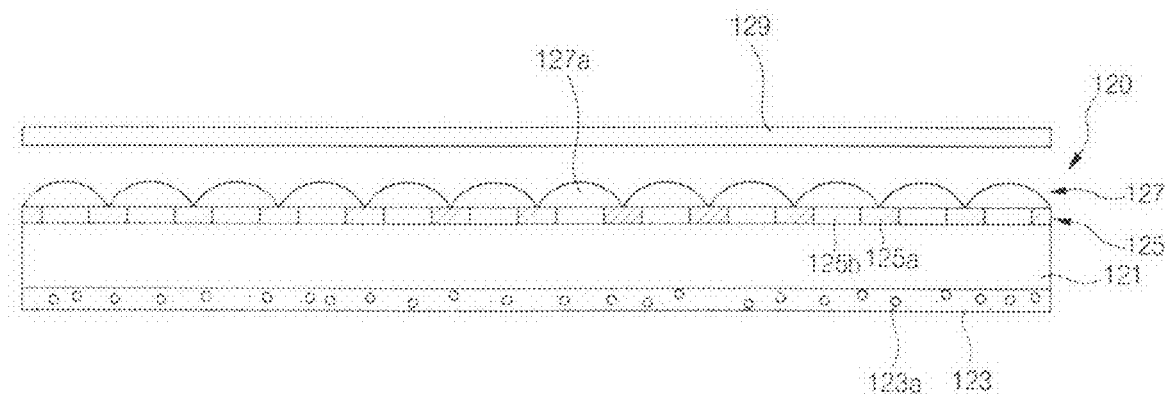
FIG. 11 is a cross-sectional view schematically illustrating a multifunctional optical sheet and a light-concentrating sheet according to the present invention.

Additionally, as shown in FIG. 11, a light-concentrating sheet 129 may be further disposed over the multifunctional optical sheet 120. The light-concentrating sheet 129 may include lenticular lens patterns or prism patterns. For example, the light-concentrating sheet 129 may include lenticular lens patterns, and the lenticular lens patterns of the light-concentrating sheet 129 may cross the lenticular lens patterns 127a of the multifunctional optical sheet 120.

Figure 12:
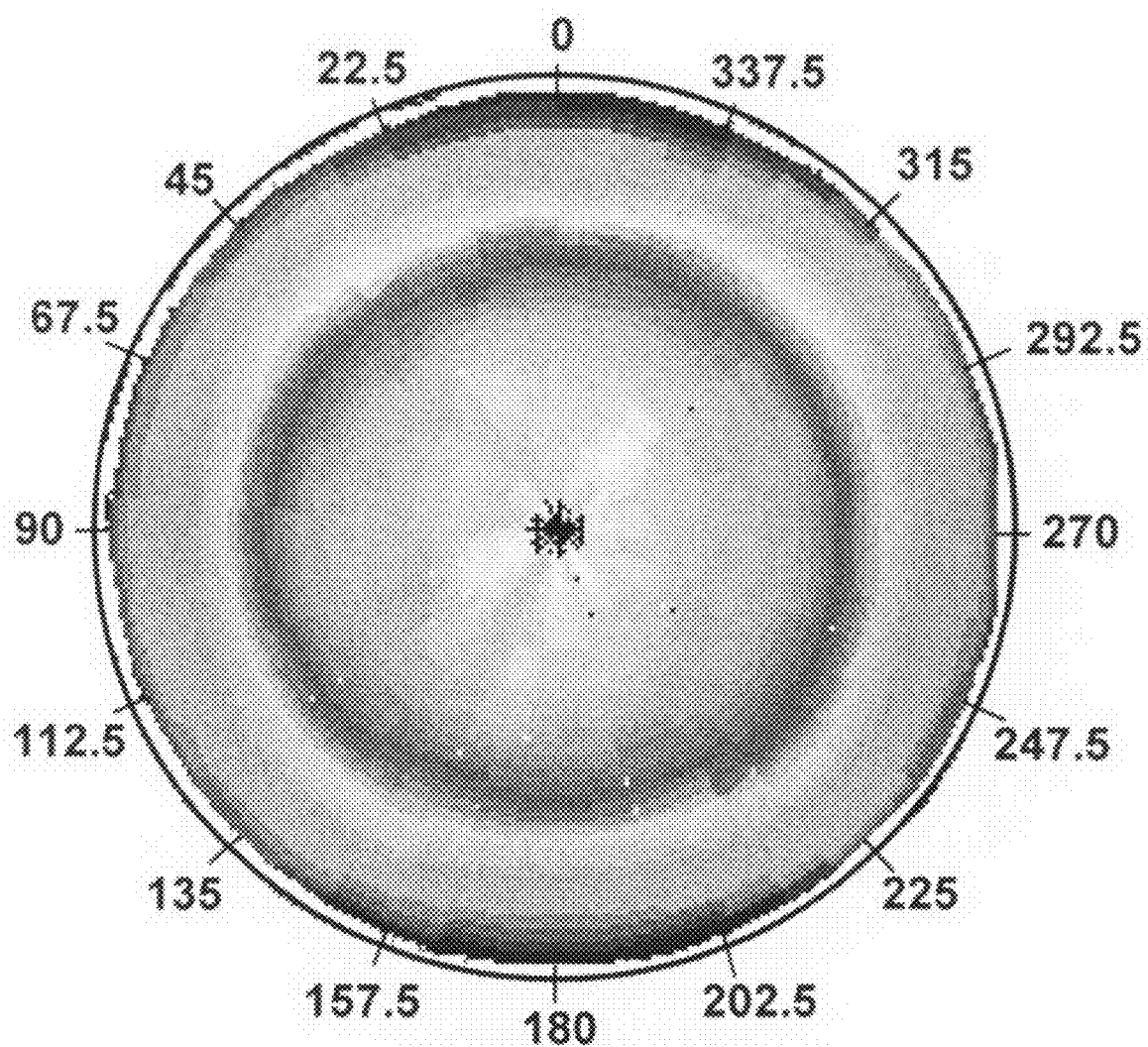
FIG. 12 is a graph illustrating a distribution of brightness versus viewing angles in a backlight unit including the multifunctional optical sheet and the light-concentrating sheet of FIG. 11.

FIG. 12 is a graph illustrating a distribution of brightness versus viewing angles in a backlight unit including the multifunctional optical sheet and the light-concentrating sheet of FIG. 11.

In FIG. 12, when the light-concentrating sheet 129 is further disposed over the multifunctional optical sheet 120, the brightness at the display panel is more uniform, and light is more effectively concentrated.

A diffuser sheet may be further disposed over the multifunctional optical sheet 120. In this case, Moiré phenomena that may occur due to arrangements of the lenticular lens patterns 127a can be controlled, and a more uniform plane light source may be provided.

Alternatively, according to the intended application, the diffusion layer 123, the light-concentrating layer 127 and the reflection layer 125 of the multifunctional optical sheet 120 may be controlled to have predetermined haze values, widths or thicknesses, and thus combinations of uniform brightness, light-concentrating effect, and planar light source can be achieved.

Figure 13:
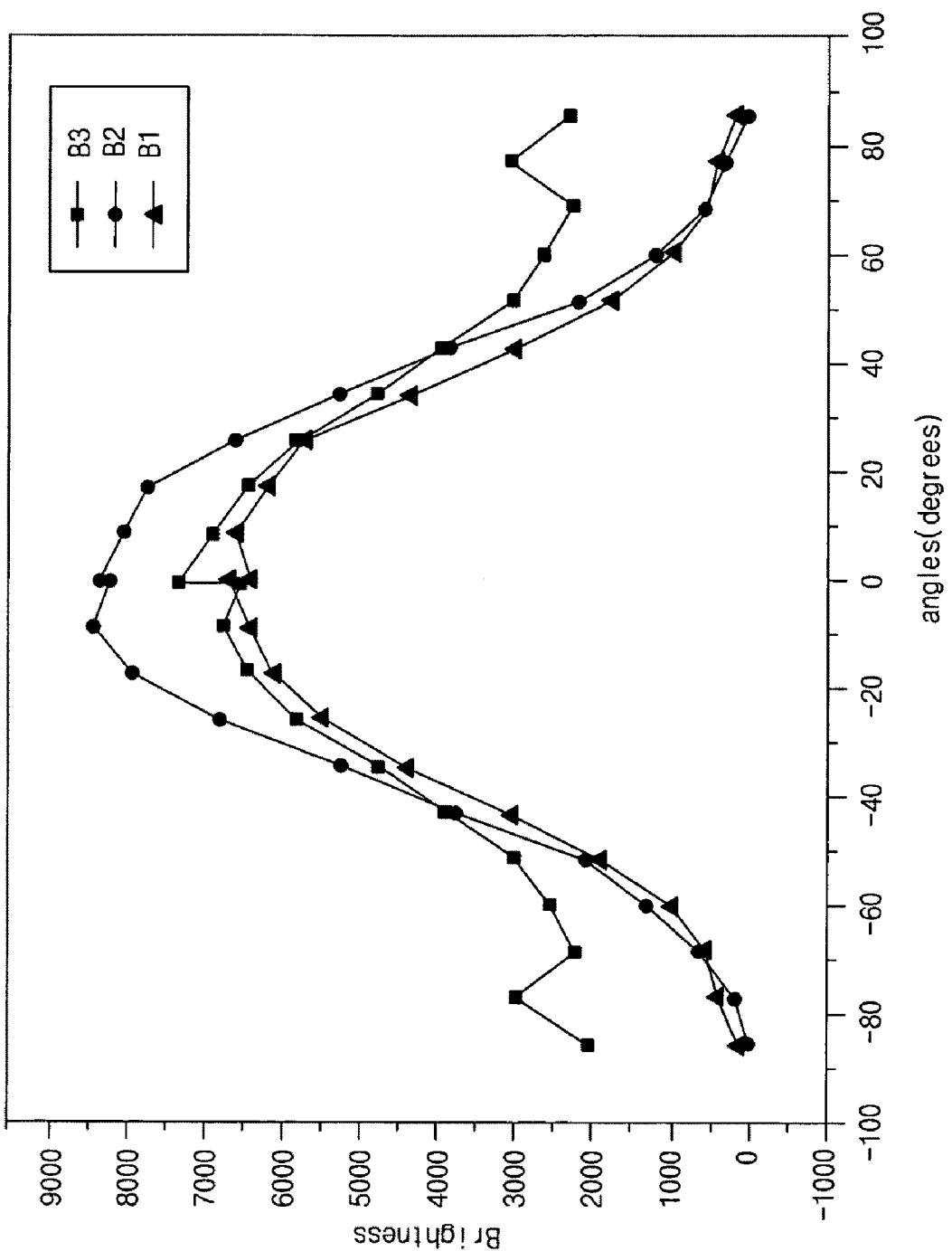
FIG. 13 is a graph illustrating distributions of brightness versus viewing angles of backlight units according to the present invention.

FIG. 13 is a graph illustrating distributions of brightness versus viewing angles of various backlight units according to the present invention. A first backlight unit B1 includes a multifunctional optical sheet, a second backlight unit B2 includes a multifunctional optical sheet and a light-concentrating sheet over the multifunctional optical sheet, and a third backlight unit B3 includes a multifunctional optical sheet and a diffuser sheet over the multifunctional optical sheet.

As shown in FIG. 13, the second backlight unit B2 that includes the lenticular lens-shaped light-concentrating sheet over the multifunctional optical sheet, substantially, has increased brightness at the front side and improved viewing angle properties.

Figure 14:
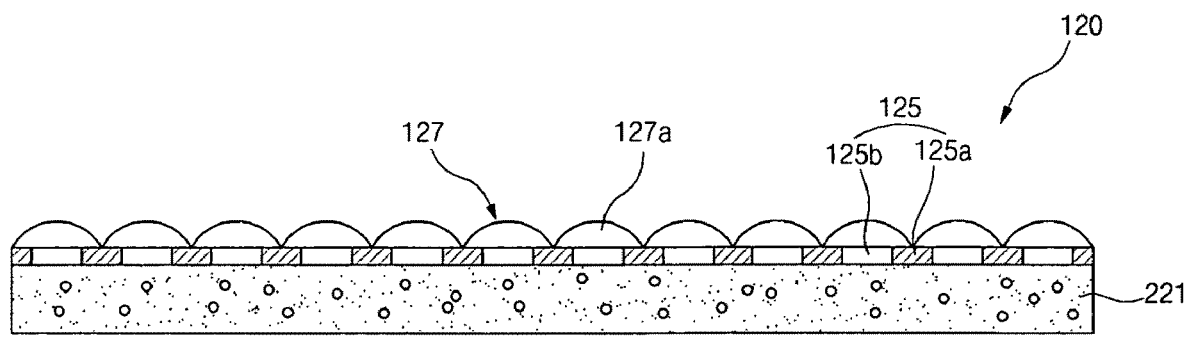
FIG. 14 is a cross-sectional view schematically illustrating another structure of a multifunctional optical sheet according to the first embodiment of the present invention.

Meanwhile, FIG. 14 is a cross-sectional view schematically illustrating another structure of a multifunctional optical sheet according to the first embodiment of the present invention. In FIG. 14, the multifunctional optical sheet 120 includes a diffuser plate 221, a reflection layer 125, and a light-concentrating layer 127. The diffuser plate 221 may be used as a substrate. That is, the diffuser plate 221 may substitute for the base plate 121 of FIG. 7. The diffuser plate 221 includes non-uniform particles and has volume scattering properties. Accordingly, the diffusion layer 123 of FIG. 7 may also be omitted.

Even though invention has been described using a direct-type backlight units as an example, the present invention can be applied to edge-type backlight units. When used with edge-type backlight units, a light guide panel is further included, and the lamps 130 of FIG. 6 are disposed at one side or both sides of the light guide panel. The multifunctional optical sheet 120 is disposed over the light guide panel.

Figure 15:
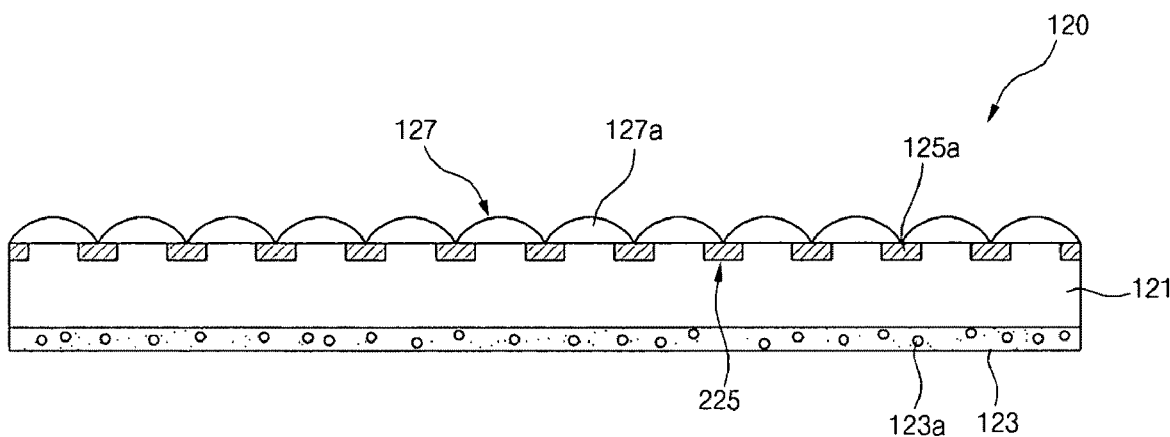
FIG. 15 is a cross-sectional view schematically illustrating a structure of a multifunctional optical sheet according to a second embodiment of the present invention.

FIG. 15 is a cross-sectional view schematically illustrating a structure of a multifunctional optical sheet according to a second embodiment of the present invention. The multifunctional optical sheet of FIG. 15 has a structure similar to that of FIG. 7. In FIG. 15, parts that are identical to parts as FIG. 7 are labeled using the same reference characters, and detailed explanations of parts identical to those illustrated in FIG. 7 may be omitted.

In FIG. 15, the multifunctional optical sheet 120 includes a base plate 121, a diffusion layer 123 and a light-concentrating layer 127. The diffusion layer 123 is formed at a lower surface of the base plate 121 and has haze properties of about 40% to about 80%. The light-concentrating layer 127 is formed at an upper surface of the base plate 121 opposite to the diffusion layer 123 and is composed of lenticular lens patterns 127a. A plurality of grooves 225 are formed at the upper surface of the base plate 121 corresponding to valleys at which the lenticular lens patterns 127a are connected to each other.

The plurality of grooves 225 are spaced apart from each other. Each groove 225 has a band shape along a length direction and a cross-section of a rectangular shape. Reflection patterns 125a are formed in the grooves 225 and may be made of titanium oxide ($TiO_2$) or magnesium oxide (MgO).

Figure 16:
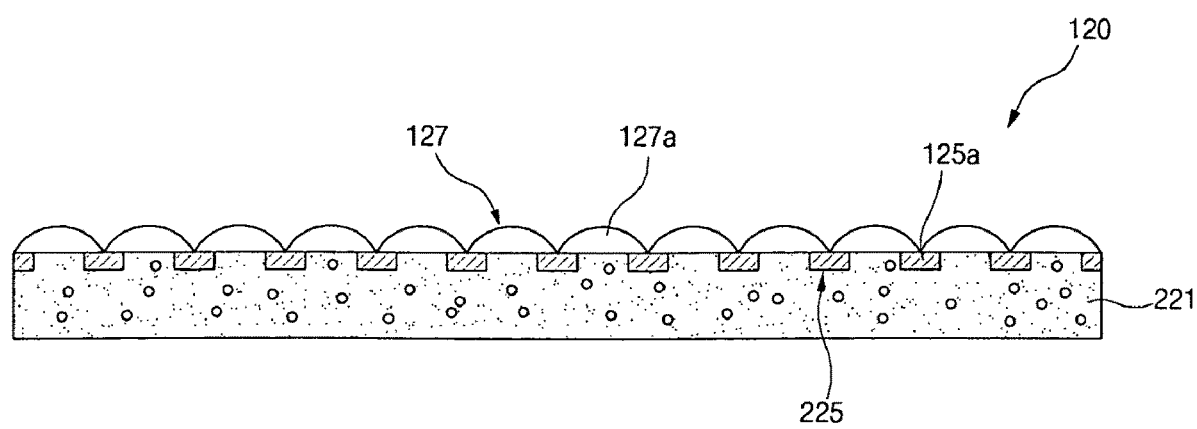
FIG. 16 is a cross-sectional view schematically illustrating another structure of a multifunctional optical sheet according to the second embodiment of the present invention.

FIG. 16 is a cross-sectional view schematically illustrating another structure of a multifunctional optical sheet according to the second embodiment of the present invention. In FIG. 16, the multifunctional optical sheet 120 includes a diffuser plate 221 and a light-concentrating layer 127. The diffuser plate 221 may be used as a substrate. The diffuser plate 221 may substitute for the base plate 121 of FIG. 15. The diffuser plate 221 includes non-uniform particles and has volume scattering properties. A plurality of grooves 225 are formed at an upper surface of the diffuser plate 225. The plurality of grooves 225 correspond to valleys at which the lenticular lens patterns 127a are connected to each other. Accordingly, the diffusion layer 123 of FIG. 15 may also be omitted.

The multifunctional optical sheet 120 according to the present invention includes the diffusion layer 123 for diffusing light emitted from the lamps 130 of FIG. 6, the light-concentrating layer 127 for concentrating light diffused by the diffusion layer 123 to the liquid crystal panel 110 of FIG. 6, and the reflection layer 125 for recycling part of light. Accordingly, the loss of light due to the side lobes is prevented. Moreover, the light efficiency and the viewing angle properties are prevented from being decreased or lowered.

Further, when the light-concentrating sheet 129 or the diffuser sheet is disposed over the multifunctional optical sheet 120, the efficiency of concentrating light and the brightness at the front side are improved. The liquid crystal display device displays images having more uniform brightness and high quality.

In addition, when the liquid crystal display device is manufactured according to the current invention, the manufacturing process efficiency can be improved, and the manufacturing costs may be decreased.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A multifunctional optical sheet for a liquid crystal display device, comprising:
   a substrate diffusing incident light;

a light-concentrating layer on the substrate and including a plurality of patterns that arranged to form alternating peaks and valleys; and a reflection layer between the substrate and the light-concentrating layer, the reflection layer including reflection patterns and a transparent insulating material between adjacent reflection patterns, the reflection patterns corresponding to the valleys of the light concentrating layer, respectively, wherein an aperture ratio of the multifunctional optical sheet due to the reflection patterns is within a range of about 30% to about 40%.

2. The multifunctional optical sheet according to claim 1, wherein the substrate includes a base plate and a diffusion layer on a lower surface of the base plate opposite to an upper surface of the base plate on which the light-concentrating layer is disposed.

3. The multifunctional optical sheet according to claim 2, wherein the diffusion layer has a haze value within a range of 40% to 80%.

4. The multifunctional optical sheet according to claim 3, wherein the diffusion layer includes an acrylic resin material with beads therein.

5. The multifunctional optical sheet according to claim 3, wherein the diffusion layer includes one of elliptical, polygonal and hologram patterns at a lower surface of the diffusion layer.

6. The multifunctional optical sheet according to claim 1, wherein the substrate includes a diffuser plate having non-uniform particles therein.

7. The multifunctional optical sheet according to claim 1, wherein the reflection patterns are formed of titanium oxide or magnesium oxide.

8. The multifunctional optical sheet according to claim 1, wherein the plurality of patterns include one of dome-shaped lenticular lens patterns and prism patterns.

9. A liquid crystal display device, comprising:
a liquid crystal panel;
a multifunctional optical sheet under the liquid crystal panel, the multifunctional optical sheet including a light-diffusing means, a light-concentrating means including peaks and valleys alternating each other, and a reflection layer between the light-diffusing means and the light-concentrating means, the reflection layer including reflection patterns and a transparent insulating material between adjacent reflection patterns, the reflection patterns corresponding to the valleys, respectively, wherein an aperture ratio of the multifunctional optical sheet due to the reflection patterns is within a range of about 30% to about 40%;
at least one lamp under the multifunctional optical sheet; and
a reflection sheet under the at least one lamp.

10. The device according to claim 9, wherein the light-diffusing means has haze values within a range of 40% to 80%.

11. The device according to claim 10, wherein the light-diffusing means includes beads therein or includes one of elliptical, polygonal and hologram patterns at a lower surface of the diffusion layer.

12. The device according to claim 10, wherein the light-diffusing means has volume scattering properties.

13. The device according to claim 9, further comprising a light-concentrating sheet over the multifunctional optical sheet.

14. The device according to claim 13, wherein the light-concentrating means and the light-concentrating sheet include one of lenticular lens patterns and prism patterns, and patterns of the light-concentrating means cross patterns of the light-concentrating sheet.

15. The device according to claim 9, further comprising a diffuser sheet over the multifunctional optical sheet.

16. The device according to claim 9, wherein a plurality of lamps are arranged directly under the multifunctional optical sheet and disposed side by side.

17. The device according to claim 9, further comprising a light guide panel under the multifunctional optical sheet, and the at least one lamp is disposed at least one side surface of the light guide panel.

* * * * *